March 8, 1932.   C. A. HOXIE   1,848,886
SOUND RECORDING AND REPRODUCING
Filed Oct. 30, 1926
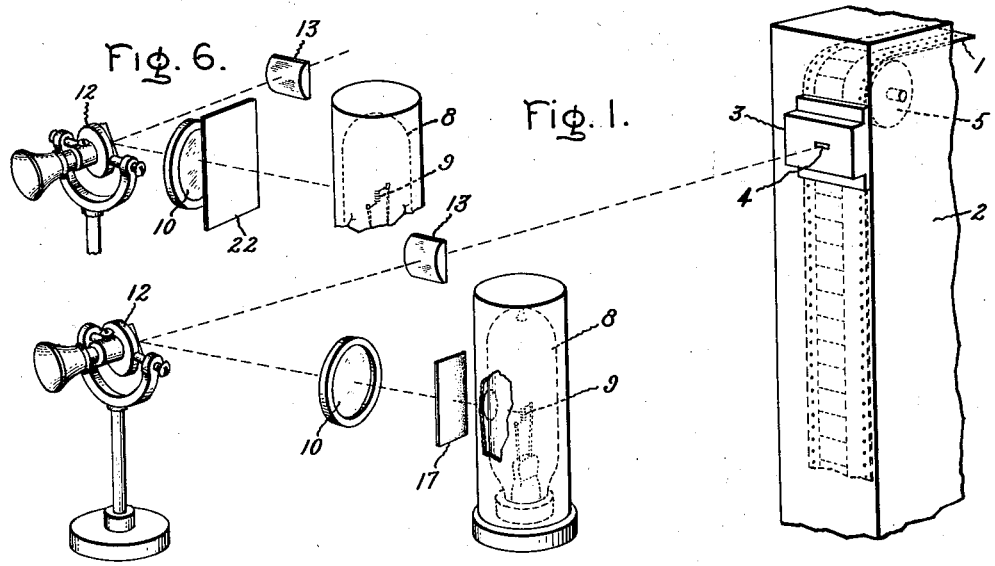
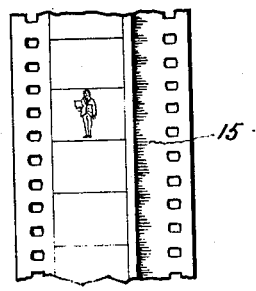
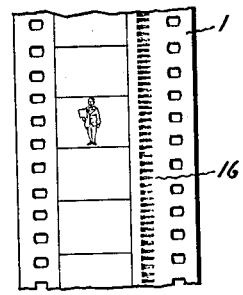
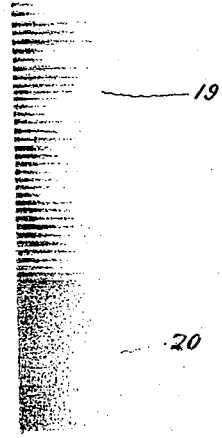
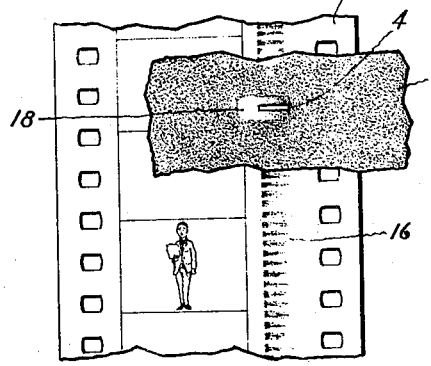
Inventor:
Charles A. Hoxie Patented Mar. 8, 1932

1,848,886

UNITED STATES PATENT OFFICE

CHARLES A. HOXIE, OF ALPLAUS, NEW YORK, ASSIGNOR TO GENERAL ELECTRIC COMPANY, A CORPORATION OF NEW YORK

SOUND RECORDING AND REPRODUCING

Application filed October 30, 1926. Serial No. 145,350.

My invention relates to the recording and reproducing of sounds, and particularly to photographically recording sounds on a moving, light-sensitive member. An object of my invention is to provide an improved photographic sound record and improved method and apparatus for making the same, whereby the manipulation of the apparatus is simplified and a record is made which accurately records the sounds and which may have any desired width.

My invention will be better understood from the following description, taken in connection with the accompanying drawings, and its scope will be pointed out in the appended claims.

Referring to the drawings, Fig. 1 is a diagrammatic view of apparatus for making a film record involving one embodiment of my invention; Fig. 2 shows a fragment of a talking picture film having a sound record along one side of the pictures, over which record my present invention is an improvement; Fig. 3 shows a similar film having my improved sound record thereon; Fig. 4 shows an enlarged fragment of the film shown in Fig. 3 with the narrow light aperture on which the exposing light beam is directed; Fig. 5 shows how a sound record such as shown in Fig. 4 would appear if the light aperture were extended indefinitely to the right, as viewed in Fig. 4; and Fig. 6 shows a modified form of apparatus.

In Fig. 1 I have shown diagrammatically apparatus for photographically recording sound on a moving sensitive film similar, to a certain extent, to that disclosed in Patent 1,598,377, Aug. 31, 1926, for Recording sound, issued in my name to the assignee of the present application. I have shown the sensitive film 1 which, in this case, is a talking picture film protected by a suitable enclosure 2 in one wall of which is mounted the aperture unit 3 having the narrow aperture 4. Through this aperture is projected the beam of light by which the film is exposed to make the sound record. For this purpose, the aperture is preferably arranged opposite a marginal portion of the film, the central portion of the film being occupied by the picture record. The length of the aperture is unimportant, but in width it is made very narrow, a width of one one-thousandth of an inch having been found satisfactory, the narrow portion of the aperture being arranged at the inner side of the aperture unit close to the moving film. The film is driven at a uniform rate by suitable sprocket wheels, one of which is shown, for example, at 5. The same film may pass directly from the sound recording apparatus to the picture recording apparatus (not shown) or vice versa, the two records being thereby made simultaneously on the same film, or if desired, the picture and sound records may be made independently on separate films, the two records being combined afterwards on a single film.

A source of light 8, shown comprising an incandescent lamp having a small concentrated filament 9, projects a beam of light through the spherical lens 10 on the small rectangular mirror (not shown) forming a part of the moving system of the sound actuated device 12 such as disclosed in the aforesaid Patent 1,598,377 and in Patent 1,456,595, issued in my name May 29, 1923, also to the assignee of the present application. The light beam falling upon the mirror is reflected toward the aperture 4, the beam being concentrated vertically by the cylindrical lens 13. Thus, the beam reflected by the mirror of device 12 forms a bright spot on the aperture unit 3, which is approximately rectangular, as illustrated by dotted lines in Fig. 4 of the aforementioned Patent 1,598,377. The saw tooth record produced by vibrating such a beam is what may be termed a paint brush record since, as shown in said Fig. 4, it is solid black on a white field. Such a record I have shown at 15 in Fig. 2 of the present application to assist by way of comparison in the understanding of the record involving my present invention. With the former saw tooth or paint brush record, it is found to be essential for obtaining the desired volume and for preserving the quality to include in the record the entire amplitude of vibration. This is often inconvenient where the available space is limited, as for example when the sound record must be made between the pictures and the sprocket holes in a moving picture film, and very careful adjustment is required to get the full amplitude of the vibration in the alloted space. For the same reason, it is also sometimes necessary to limit the volume of the sound being recorded.

In accordance with my present invention, I employ a modified form of apparatus to produce an improved sound record, shown at 16 in Figs. 3 and 4. Between the light source 8 and the lens 10 is a screen 17 which is transparent at one side and opaque at the other, the intermediate portion gradually shading off from opaque to transparent. The screen 17 is so positioned relative to the lens 10 that it and the aperture 4 are at points of conjugate focii of the lens whereby the image of the screen is focused on the aperture. The spot of light on the aperture unit 3 produced by the light beam after passing through this screen is represented at 18 in Fig. 4, where the right hand portion of the spot is shown gradually shading off for a distance approximately equal to the length of the aperture. When the beam is vibrated horizontally by the device 12 in accordance with sound waves, a record is made on the film in the form of a longitudinal band like that shown in Figs. 3 and 4, the latter being greatly enlarged. It will be seen that the width of the record band is limited by the length of the aperture employed, and that the record comprises transverse bands of variable density somewhat resembling the so-called "ladder" type record such as has been made by a fixed beam of light which varies in intensity with the sound waves. There is, however, a material and important difference between a record so made and my improved record. The bands in my record, while appearing at first glance to be of uniform width, will be seen upon closer examination to be tapering, the wider ends of the dark bands being all at the same side of the record strip. The reason for this will be more apparent upon reference to Fig. 5, where I have endeavored to show at 19 how the sound record would appear if the aperture 4 were to be extended indefinitely to the right. In this figure, the portion 20 represents the record made when there is no sound. In the case of this record, every slight movement of the light beam is manifest at all points in the width of the record. Whether the beam undergoes a movement of large amplitude corresponding to a fundamental wave, or undergoes a movement of very small amplitude corresponding to an overtone, a record of the movement is left in the form of a band extending across the record space. As a result, the amplitude of vibration of the beam need not be limited to the width of the allotted space on the film, as in the paint brush type of record. The width of the sound record may be made very narrow and still sufficient volume of reproduced sound be obtained, inasmuch as the volume with this record depends upon the density instead of the amplitude. A narrow sound record, obviously, is of great advantage in a talking movie film where it may occupy the narrow strip between the pictures and one row of sprocket openings or between the sprocket openings and one edge of the film, and it is also advantageous with a film carrying a plurality of sound record paths or tracks in permitting a longer sound record with the same length of film. Not only may the sound record be very narrow, but the position of the aperture governing the record relative to the light beam is not critical, and careful adjustment of the light beam, both as to intensity and to position is not required. There is also no necessity of limiting the volume of the sound being recorded, as will be obvious.

In making records of the ladder type referred to above, having bands of uniform width, care must be exercised in exposing and developing the record that the record shall not be too dense or too transparent, that is, the dark bands must not be uniformly black for any appreciable distance, nor the light bands be uniformly clear for any appreciable distance, for where there is no variation in the amount of light transmitted through the film in reproducing, there will be no sound. In the case of my record, this difficulty is largely, if not entirely, avoided, for, since the bands vary in density from one end to the other, if certain bands are too dense or too thin at one end they will probably be of proper density at the other end to give the desired light variation.

In the modified form of apparatus shown in Fig. 6, I employ a plain opaque screen 22 placed out of focus of the lens 10, as for example close to the lens, and in such a position that it partially covers the lens, the overlapping edge being vertical. The light beam which is reflected on the aperture will thereby have one side which gradually shades off like that shown in Fig. 4, and when vibrated by the sound actuated device 12, will produce a record like that shown in Figs. 3 and 4.

While I have used the term light in the description and claims in connection with the beam by which the film is exposed, I intend that this term should not be restricted to those rays which are visible, but include as well those invisible rays which also may be employed to effect the photographic record.

What I claim as new and desire to secure by Letters Patent of the United States is:

1. The method of producing a sound record on a movable light sensitive member which comprises exposing the member to a narrow transverse light beam of uniform width and causing the intensity of the beam to vary transversely of the member in accordance with the sound waves to be recorded.

2. The method of producing a sound record on a movable light sensitive member arranged to be exposed to light passing through a narrow transverse opening which comprises projecting on said opening a light beam of varying intensity longitudinally of the opening and vibrating the beam longitudinally of the opening in accordance with the sound waves to be recorded.

3. Apparatus for photographically recording sound comprising means adapted to movably support a light-sensitive member, a member having a narrow aperture through which light may be admitted to the member, means for directing on the aperture a beam of light having one side thereof gradually shading off and sound responsive means for causing said beam to vibrate transversely with respect to the movement of the light sensitive member.

4. Apparatus for photographically recording sound comprising means adapted to movably support a sensitive film, a member having a narrow aperture extending transversely of the film through which light may be admitted to the film, means for directing a beam of light toward the aperture, sound responsive means for causing the beam to vibrate lengthwise of the aperture, and means arranged in the path of the beam for causing one side of the beam gradually to shade off lengthwise of the aperture.

5. Apparatus for photographically recording sound comprising means adapted to movably support a light-sensitive film, a member having a narrow aperture extending transversely of the film through which light may be admitted to the film, a source of light, a sound responsive mirror for reflecting a light beam from said source toward said aperture, and means arranged in the path of said beam for causing a gradual shading off in the intensity of that part of the beam passing through the aperture longitudinally thereof.

6. Apparatus for photographically recording sound comprising means adapted to movably support a light-sensitive film, a member having a narrow light aperture behind which the film is adapted to pass, a source of light, a diaphragm, a mirror mounted to be rocked thereby for reflecting a light beam on the aperture, a condensing lens between the light source and the mirror, a cylindrical lens between the mirror and the aperture, and a member arranged between the light source and the mirror for causing a gradual shading off in the intensity of the light beam from one end of the aperture to the other.

7. A photographic sound record comprising a band of substantially uniform width varying in density longitudinally thereof in accordance with sound waves and varying in density transversely thereof.

8. A photographic sound record comprising a longitudinal band of uniform width composed of transverse bands varying in density longitudinally of the record in accordance with sound waves and varying in density transversely thereof.

9. A photographic sound record forming a track of uniform width and comprising a series of transverse bands, said bands being relatively variable in density in accordance with the sound waves represented thereby and being variable in density from one end to the other.

10. A photographic sound record comprising a series of transverse bands of uniform length, the relative densities of which correspond to the sound waves represented thereby, said bands having corresponding ends denser than the opposite ends.

11. A photographic sound record forming a longitudinal band of uniform width and comprising a series of transverse tapering portions varying in density longitudinally of the record in accordance with sound waves.

12. A photographic sound record forming a longitudinal band of uniform width and comprising a series of transverse tapering bands varying in density longitudinally of the record, the density of said bands also varying in accordance with their width.

In witness whereof, I have hereunto set my hand this 28th day of October, 1926.

CHARLES A. HOXIE.